(12) United States Patent
Dong et al.

(10) Patent No.: US 11,181,610 B2
(45) Date of Patent: *Nov. 23, 2021

(54) POSITIONING LIGHT BEAM EMISSION SYSTEM, METHOD AND INDOOR POSITIONING SYSTEM

(71) Applicant: Guo Cheng Wan Tong Information Technology Co., LTD, Beijing (CN)

(72) Inventors: Rongsheng Dong, Beijing (CN); Cheng Guo, Beijing (CN); Zuyong Xie, Beijing (CN)

(73) Assignee: BEIJING GUO CHENG WAN TONG INFORMATON TECHNOLOGY CO., LTD, Beijing (CN)

( * ) Notice: Subject to any disclaimer, the term of this patent is extended or adjusted under 35 U.S.C. 154(b) by 581 days.

This patent is subject to a terminal disclaimer.

(21) Appl. No.: 16/131,558

(22) Filed: Sep. 14, 2018

(65) Prior Publication Data

US 2019/0041490 A1 Feb. 7, 2019

Related U.S. Application Data

(63) Continuation of application No. PCT/CN2017/073905, filed on Feb. 17, 2017.

(30) Foreign Application Priority Data

Mar. 16, 2016 (CN) .......................... 201610150016.X

(51) Int. Cl.
*G01S 5/16* (2006.01)
*G01C 21/20* (2006.01)

(52) U.S. Cl.
CPC .............. *G01S 5/16* (2013.01); *G01C 21/206* (2013.01)

(58) Field of Classification Search
CPC ...... G01C 3/08; G01C 15/002; G01C 15/004; G01C 21/206; G01S 1/70; G01S 5/16;
(Continued)

(56) References Cited

U.S. PATENT DOCUMENTS 9,354,318 B1 * 5/2016 Beard ..................... G01S 17/04
2002/0060788 A1 * 5/2002 Ohtomo ............... G01C 15/002
356/139.1

(Continued)

FOREIGN PATENT DOCUMENTS

CN 1841086 10/2006
CN 102033222 4/2011
(Continued)

*Primary Examiner* — Stephen R Burgdorf
(74) *Attorney, Agent, or Firm* — Treasure IP Group, LLC

(57) ABSTRACT

The invention discloses a positioning light beam emission system, a method and an indoor positioning system. A positioning space includes a plurality of positioning sub-spaces. A plurality of positioning light beam emission devices are fixed at predetermined positions in the plurality of positioning sub-spaces, respectively, and the positioning light beam emission devices are used to emit positioning light beams toward the respective positioning sub-spaces in a sweeping manner with a predetermined sweeping cycle and predetermined angular velocity. Each positioning light beam has a linear cross section and is rotated about a rotation axis in the sweeping manner, the rotation axis not perpendicular to an extended direction of the linear cross section.

21 Claims, 5 Drawing Sheets

(58) Field of Classification Search
CPC ...... G01S 7/4814; G01S 7/4817; G01S 17/42; G01S 17/93; G01S 11/12; G02B 26/10; G06F 3/0423
USPC ........................................................ 356/3.12
See application file for complete search history.

(56) References Cited

U.S. PATENT DOCUMENTS

2005/0230609 A1* 10/2005 Randall .............. A63B 24/0021
250/234
2015/0237471 A1* 8/2015 Li ........................ H04W 4/029
455/456.2

FOREIGN PATENT DOCUMENTS

| CN | 202133771 | 2/2012 |
| CN | 103747524 | 1/2014 |
| CN | 103675872 | 3/2014 |
| CN | 204115738 | 1/2015 |
| CN | 105183166 | 9/2015 |
| CN | 105138135 | 12/2015 |
| CN | 105629200 | 6/2016 |

\* cited by examiner

POSITIONING LIGHT BEAM EMISSION SYSTEM, METHOD AND INDOOR POSITIONING SYSTEM

CROSS REFERENCE TO RELATED APPLICATION

This application claims priority to a PCT application PCT/CN2017/073905, filed on Feb. 17, 2017, which in turn takes priority of Chinese Application No. 201610150016.X, filed on Mar. 16, 2016. Both the PCT application and Chinese Application are incorporated herein by reference in their entireties.

FIELD OF THE INVENTION

The present invention relates to the field of positioning, and in particular to a positioning light beam emission system, method and indoor positioning system.

BACKGROUND OF THE INVENTION

As an auxiliary positioning of satellite positioning, indoor positioning technology can solve the problem that satellite signals are weak and cannot penetrate buildings when they reach the ground.

Laser positioning technology is a common indoor positioning technology. The scheme is to directly output three-dimensional position coordinate information by constructing a positioning light tower that emits laser light in a positioning space to perform laser sweeping for the positioning space, designing a plurality of laser receiving sensors on an object to be positioned, and performing arithmetic processing on the data at the receiving end. Its positioning process can be shown in FIG. 1.

Since the sweeping area of the laser is limited, the size of the space that can be positioned is limited by the laser range (generally in the range of 5×5×2 m). However, if a base station structure of a single positioning space is simply multiplexed and expanded, a laser overlapping area (i.e., an area where laser beams in the same direction sweep at the same time) may occur, which will inevitably lead to inaccurate positioning.

Therefore, there is a need for an indoor positioning scheme that can avoid the laser overlapping area while expanding the positioning space.

SUMMARY OF THE INVENTION

The technical problem to be solved by the present invention is to provide an indoor positioning system that can avoid the occurrence of laser overlapping areas, so that the positioning space can be expanded.

According to an aspect of the present invention, there is provided a positioning light beam emission system for emitting positioning light beams toward a positioning space, the positioning space comprising a plurality of positioning sub-spaces, the system comprising: a plurality of positioning light beam emission devices, disposed at predetermined positions in the plurality of positioning sub-spaces, respectively, each of the positioning light beam emission devices being used for emitting, in a sweeping manner, a positioning light beam toward the positioning sub-space in which it is located, with a predetermined sweeping cycle and at a predetermined angular velocity, the positioning light beam having a linear cross section and rotating about a sweeping rotation axis, and the sweeping rotation axis being not perpendicular to the extending direction of the linear cross section; and a controller, which is respectively connected with the plurality of positioning light beam emission devices, and is used for controlling sweeping modes of the plurality of positioning light beam emission devices such that the positioning light beams emitted, in a sweeping manner, by the positioning light beam emission devices in adjacent positioning sub-spaces at the same time are different, and/or the sweeping time periods of the positioning light beams emitted, in a sweeping manner, by the positioning light beam emission devices in adjacent positioning sub-spaces are different.

Preferably, each of the positioning light beam emission devices may emit, in a sweeping manner, the positioning light beam toward the positioning sub-space in which it is located, in two sweeping modes within each of the sweeping cycles, the two sweeping modes have different working periods, and the sweeping rotation axis of the second positioning light beam in the second sweeping mode has a predetermined included angle with respect to the sweeping rotation axis of the first positioning light beam in the first sweeping mode.

Preferably, the extending direction of the linear cross section and the sweeping rotation axis of the first positioning light beam are perpendicular to a horizontal plane, and the extending direction of the linear cross section and the sweeping rotation axis of the second positioning light beam are parallel to the horizontal plane; or the extending direction of the linear cross section and the sweeping rotation axis of the first positioning light beam are parallel to the horizontal plane, and the extending direction of the cross section and the sweeping rotation axis of the second positioning light beam are perpendicular to the horizontal plane.

Preferably, an effective range of the positioning light beam emitted, in a sweeping manner, by the positioning light beam emission device is set to cover the positioning sub-space in which it is located, without exceeding the positioning sub-spaces adjacent to the positioning sub-space in which it is located.

Preferably, the positioning light beam emission devices are disposed at two positions away from each other in each of the positioning sub-spaces, respectively, the two sweeping modes of the positioning light beam emission devices that are located in adjacent positioning sub-spaces and emit simultaneously are different in starting sequence, and the time periods when different positioning light beam emission devices in the same positioning sub-space emit the positioning light beams are different; or the time periods when the positioning light beam emission devices in adjacent positioning sub-spaces emit the positioning light beams are different, and the two sweeping modes of different positioning light beam emission devices in the same positioning sub-space are different in starting sequence.

Preferably, the positioning light beam emission device may comprise: a first sweeping light source for emitting the first positioning light beam toward the positioning sub-space in which it is located; a second sweeping light source for emitting, in a sweeping manner, the second positioning light beam toward the positioning sub-space in which it is located; and a surface light source for emitting a planar light pulse toward the positioning sub-space in which it is located within each of the sweeping cycles, the first sweeping light source and the second sweeping light source emit, in a sweeping manner, the positioning light beams toward the positioning sub-spaces in which they are located within different time periods of the sweeping cycle, within each of the sweeping cycles, there is a first fixed time interval between a time when the first sweeping light source starts to emit, in a sweeping manner, the first positioning light beam and a time when the surface light source emits the planar light pulse, and there is a second fixed time interval between a time when the second sweeping light source starts to emit, in a sweeping manner, the second positioning light beam and a time when the surface light source emits the planar light pulse.

Preferably, within each of the sweeping cycles, after the surface light source emits a first planar light pulse, the first sweeping light source starts to emit, in a sweeping manner, the positioning light beam toward the positioning sub-space in which it is located, and after the surface light source emits a second planar light pulse, the second sweeping light source starts to emit, in a sweeping manner, the positioning light beam toward the positioning sub-space in which it is located, and there is a fixed time interval between the first planar light pulse and the second planar light pulse, there is the first fixed time interval between a time when the first sweeping light source starts to emit, in a sweeping manner, the first positioning light beam and a time when the surface light source emits the first planar light pulse, and there is the second fixed time interval between a time when the second sweeping light source starts to emit, in a sweeping manner, the second positioning light beam and a time when the surface light source emits the second planar light pulse.

According to an aspect of the present invention, there is provided a positioning light beam emission method for emitting a positioning light beam toward a positioning space, the positioning space comprising a plurality of positioning sub-spaces, each of the positioning sub-spaces being disposed with a positioning light beam emission device, the method comprising: the positioning light beam emission device in each of the positioning sub-spaces emitting, in a sweeping manner, the positioning light beam toward the positioning sub-space in which it is located, with a predetermined sweeping cycle and at a predetermined angular velocity, the positioning light beam having a linear cross section and rotating about a sweeping rotation axis, and the sweeping rotation axis being not perpendicular to the extending direction of the linear cross section; the positioning light beams swept toward adjacent positioning sub-spaces at the same time being different, and/or the sweeping time periods of the positioning light beams swept toward adjacent positioning sub-spaces being different.

According to an aspect of the present invention, there is provided an indoor positioning system for positioning an object to be positioned in a positioning space, the positioning space comprising a plurality of positioning sub-spaces, the indoor positioning system comprising: a plurality of positioning light beam emission devices, disposed at predetermined positions in the plurality of positioning sub-spaces, respectively, each of the positioning light beam emission devices for emitting, in a sweeping manner, the positioning light beam toward the positioning sub-space in which it is located, with a predetermined sweeping cycle and at a predetermined angular velocity, wherein the positioning light beam has a linear cross section and rotates about a sweeping rotation axis, the sweeping rotation axis is not perpendicular to the extending direction of the linear cross section, and the positioning light beams emitted, in a sweeping manner, by the positioning light beam emission devices in adjacent positioning sub-spaces at the same time are different, and/or the sweeping time periods of the positioning light beams emitted, in a sweeping manner, by the positioning light beam emission devices in adjacent positioning sub-spaces are different; a plurality of beam receivers, adapted for being fixed at an outer surface of the object to be positioned, for receiving the positioning light beams, the relative spatial position relationship among the plurality of beam receivers being fixed.

Preferably, the indoor positioning system may further comprise a processor, which may determine a positioning light beam emission device corresponding to the positioning light beam, according to a positioning light beam received by the plurality of beam receivers and/or the time of receiving the positioning light beam, and determine the position of the object to be positioned according to the time when the plurality of beam receivers respectively receive the positioning light beam within one sweeping cycle, the angular velocity, the relative spatial position relationship, and the determined predetermined position of the positioning light beam emission device.

Preferably, each of the positioning light beam emission devices may emit, in a sweeping manner, the positioning light beam toward the positioning sub-space in which it is located in two sweeping modes within each of the sweeping cycles, the two sweeping modes have different working periods, the sweeping rotation axis of the second positioning light beam in the second sweeping mode has a predetermined included angle with respect to the sweeping rotation axis of the first positioning light beam in the first sweeping mode.

Preferably, the processor may determine the direction of the light beam receiver relative to the positioning light beam emission device, according to the time when the light beam receiver receives the first positioning light beam and the time when it receives the second positioning light beam within each of the sweeping cycles, and/or the processor determines the position of the object to be positioned, according to the directions of the plurality of light beam receivers that receive both the first positioning light beam and the second positioning light beam within one sweep cycle, relative to the positioning light beam emission device, and a predetermined relative spatial position relationship among the plurality of light beam receivers.

Preferably, the extending direction of the linear cross section and the sweeping rotation axis of the first positioning light beam are perpendicular to a horizontal plane, and the extending direction of the linear cross section and the sweeping rotation axis of the second positioning light beam are parallel to the horizontal plane; or the extending direction of the linear cross section and the sweeping rotation axis of the first positioning light beam are parallel to the horizontal plane, and the extending direction of the cross section and the sweeping rotation axis of the second positioning light beam are perpendicular to the horizontal plane.

Preferably, an effective range of the positioning light beam emitted, in a sweeping manner, by the positioning light beam emission device is set to cover the positioning sub-space in which it is located, without exceeding the positioning sub-spaces adjacent to the positioning sub-space in which it is located.

Preferably, the positioning light beam emission devices are disposed at two positions away from each other in each of the positioning sub-spaces, respectively, the two sweeping modes of the positioning light beam emission device that are located in adjacent positioning sub-spaces and sweep simultaneously are different in starting sequence, and the time periods when different positioning light beam emission devices in the same positioning sub-space emit, in a sweeping manner, the positioning light beams are different; or the time periods when the positioning light beam emission devices in adjacent positioning sub-spaces emit, in a sweeping manner, the positioning light beams are different, and the two sweeping modes of different positioning light beam emission devices in the same positioning sub-space are different in starting sequence.

Preferably, the positioning light beam emission device may comprise: a first sweeping light source for emitting, in a sweeping manner, the first positioning light beam toward the positioning sub-space in which it is located; a second sweeping light source for emitting, in a sweeping manner, the second positioning light beam toward the positioning sub-space in which it is located; and a surface light source for emitting a planar light pulse toward the positioning sub-space in which it is located within each of the sweeping cycles, the first sweeping light source and the second sweeping light source emit, in a sweeping manner, the positioning light beams toward the positioning sub-spaces in which they are located within different time periods of the sweeping cycle, within each of the sweeping cycles, there is a first fixed time interval between a time when the first sweeping light source starts to emit, in a sweeping manner, the first positioning light beam and a time when the surface light source emits the planar light pulse, and there is a second fixed time interval between a time when the second sweeping light source starts to emit, in a sweeping manner, the second positioning light beam and a time when the surface light source emits the planar light pulse.

Preferably, planar light pulses emitted by surface light sources in two positioning light beam emission devices located in the same positioning sub-space are different, and the processor determines the positioning light beam emission device corresponding to the surface light source emitting a planar light pulse according to the planar light pulse received by the light beam receiver.

Preferably, within each of the sweeping cycles, after the surface light source emits the first planar light pulse, the first sweeping light source starts to emit, in a sweeping manner, the positioning light beam toward the positioning sub-space in which it is located, and after the surface light source emits the second planar light pulse, the second sweeping light source starts to emit, in a sweeping manner, the positioning light beam toward the positioning sub-space in which it is located, and there is a fixed time interval between the first planar light pulse and the second planar light pulse, there is the first fixed time interval between a time when the first sweeping light source starts to emit, in a sweeping manner, the first positioning light beam and a time when the surface light source emits the first planar light pulse, and there is the second fixed time interval between a time when the second sweeping light source starts to emit, in a sweeping manner, the second positioning light beam and a time when the surface light source emits the second planar light pulse.

In summary, compared with the existing laser positioning technology, the indoor positioning system of the present invention allows the positioning space to be expanded while maintaining the advantages of laser positioning, and the occurrence of laser overlapping areas can be avoided while expanding the positioning space.

BRIEF DESCRIPTION OF THE DRAWINGS

The above and other objects, features, and advantages of the present invention will become more apparent from the detailed description of exemplary embodiments of the present disclosure taken in conjunction with the accompanying drawings, wherein the same reference numerals generally denote the same components in the exemplary embodiments of the present disclosure.

DETAILED DESCRIPTION

Figure 1:
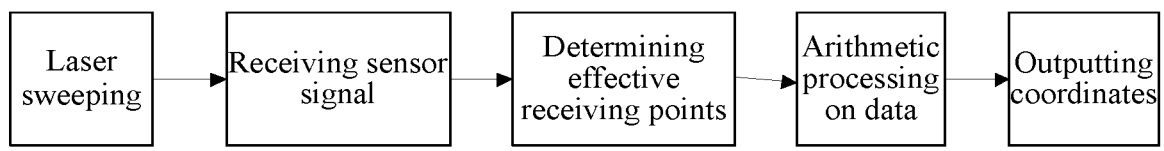
FIG. 1 shows the implementation flow of an existing laser positioning scheme.

Preferred embodiments of the present disclosure will be described in more detail below with reference to the accompanying drawings. While the preferred embodiments of the present disclosure have been shown in the drawings, it is understood that the present disclosure may be implemented in various forms and should not be limited by the embodiments set forth herein. Rather, these embodiments are provided so that the present disclosure will be thorough and complete, and the scope of the present disclosure can be fully conveyed to those skilled in the art.

The present invention provides a positioning light beam emission method for emitting a positioning light beam toward a positioning space, the positioning space comprising a plurality of positioning sub-spaces, each of the positioning sub-spaces being disposed with positioning light beam emission devices, the method comprising: the positioning light beam emission device in each of the positioning sub-spaces emitting, in a sweeping manner, the positioning light beam toward the positioning sub-space in which it is located with a predetermined sweeping cycle and at a predetermined angular velocity, the positioning light beam having a linear cross section and rotating about a sweeping rotation axis, and the sweeping rotation axis being not perpendicular to the extending direction of the linear cross section; the positioning light beams swept toward adjacent positioning sub-spaces at the same time being different, and/or the sweeping time periods of the positioning light beams swept toward adjacent positioning sub-spaces being different. Based on the positioning light beam emission method of the present invention, the positioning space can be expanded, and the occurrence of laser overlapping areas can be avoided while expanding the positioning space.

The positioning light beam emission method of the present invention can be realized as a positioning light beam emission system, and the positioning light beam emitting method of the present invention will be described in detail below in conjunction with the positioning light beam emission system.

Figure 2:
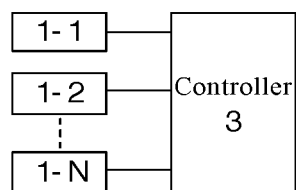
FIG. 2 is a schematic block diagram showing a structure of the positioning light beam emission system according to an embodiment of the present invention.

As shown in FIG. 2, the positioning light beam emission system of the present invention comprises a plurality of positioning light beam emission devices (1-1, 1-2, ..., 1-N in the figure, N is an integer) and a controller 3.

The plurality of positioning light beam emission devices are fixed at predetermined positions in a plurality of positioning sub-spaces, respectively, such that at least one positioning light beam emission device is disposed in each of the positioning sub-spaces. Each of the positioning light beam emission devices may sweep a positioning light beam toward the positioning sub-space in which it is located with a predetermined sweeping cycle and at a predetermined angular velocity, the positioning light beam emitted, in a sweeping manner, by the positioning light beam emission device has a linear cross section and rotates about a sweeping rotation axis, and the sweeping rotation axis is not perpendicular to an extending direction of the linear cross section.

Among others, the positioning light beam emission device emitting, in a sweeping manner, the positing light beam toward the positioning sub-space in which it is located, may be implemented in a plurality of ways. For example, the positioning light beam emission device emitting, in a sweeping manner, the positing light beam toward the positioning sub-space in which it is located, may be implemented by means of motor rotation sweeping, MEMS sweeping mirror sweeping, single-mode fiber dither sweeping, and the like. Of course, other implementations are also possible for those skilled in the art, and details are not described herein again.

The predetermined sweeping cycle (T) may or may not correspond to the predetermined angular velocity ($\omega$).

For example, when the positioning light beam emission device rotates uniformly about the sweeping rotation axis, it can be considered that the sweeping cycle corresponds to the predetermined angular velocity, in which case $T=2\pi/\omega$.

On the other hand, in some cases, the positioning light beam emission device only needs to be rotated for less than one round, for example, about a quarter of one round, i.e., about 90°, so that the positioning sub-space can be completely emitted, in a sweeping manner, by the sweeping light beam. Thus, the rotational speed when the positioning sub-space is emitted, in a sweeping manner, by the sweeping light beam may be different from that when the positioning sub-space is not emitted, in a sweeping manner, by the sweeping light beam. Alternatively, the positioning light beam emission device may be configured such that the sweeping light beam reciprocally sweeps in the positioning sub-space. In these cases, $T \neq 2\pi/\omega$.

The linear cross section refers to a cross section taken by a plane parallel to the sweeping rotation axis. To better understand the linear cross section of the positioning light beam, it will be further explained below with reference to FIG. 3 and FIG. 4.

Figure 3:
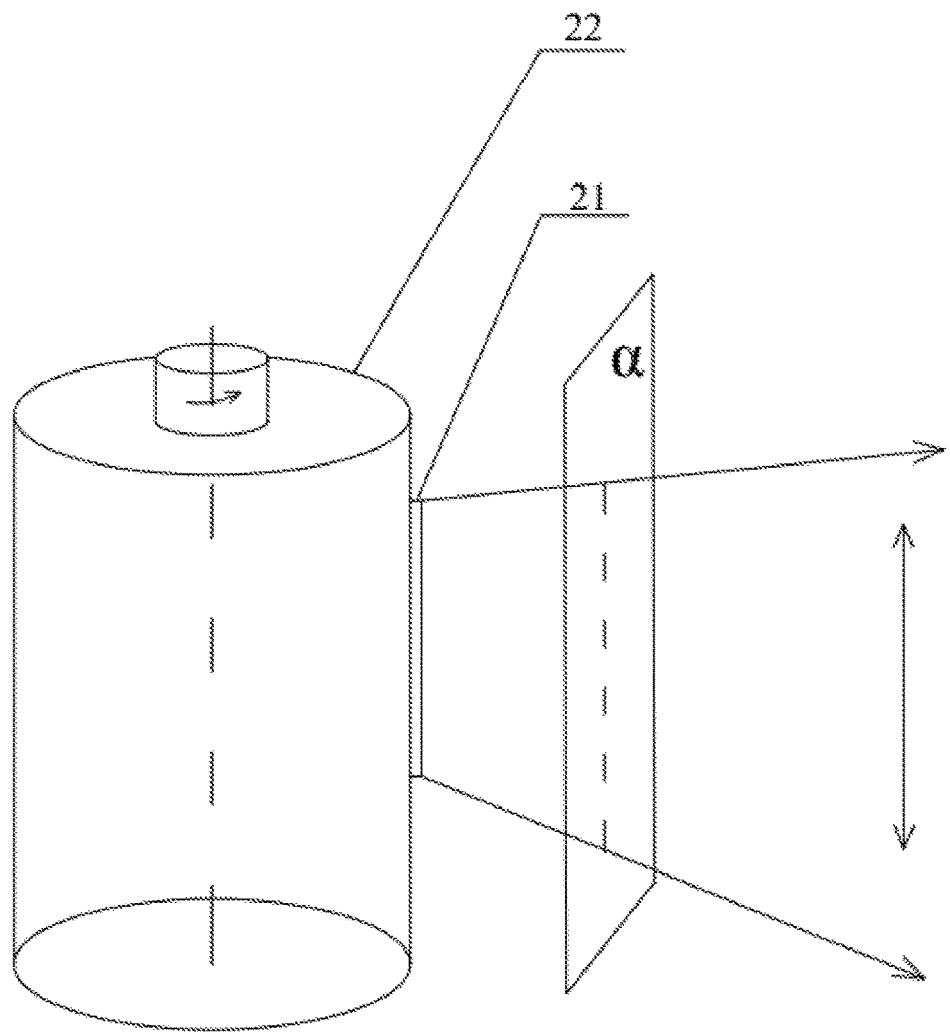
FIG. 3 shows a structural schematic view of the positioning light beam emission device.

FIG. 3 shows a structural schematic view of a positioning light beam emission device. As shown in FIG. 3, the positioning light beam emission device may be constituted by a sweeping light source 21 and a rotating device 22, the sweeping light source 21 is fixed to the rotating device 22, and the rotating device 22 can rotate about a fixed axis. Among others, the sweeping light source 21 can be a vertical linear light source (such as a linear light source obtained after a light source passes through a slit), or an array light source. Of course, it may also be other light sources.

After the rotating device 22 is rotated by a certain angle about a rotation axis, the positioning light beam emitted by the sweeping light source 21 can cover most or the entire area of the positioning sub-space.

Figure 4:
FIG. 4 is a schematic view of a linear cross section of the positioning light beam.

The positioning light beam emitted by the sweeping light source 21 has a linear cross section. Here, the linear cross section refers to a plane taken by a plane a parallel to a sweeping rotation axis (i.e. an axis of rotation), which is as shown in FIG. 4. The smaller the width of the cross section is, the larger the length is. Therefore, it may be referred to as a linear cross section, and an extending direction of the linear cross section refers to the direction of the length of the linear cross section (the direction indicated by a two-way arrow in the figure).

In the case where the sweeping rotation axis is perpendicular to the extending direction of the linear cross section, when the sweeping rotation axis is rotated, the range in which the positioning light beam can be reached is a plane having a very small thickness, and the range that can be covered is very small. Herein, therefore, it is necessary to define that the sweeping rotation axis is not perpendicular to the extending direction of the linear cross section, so that when the sweeping rotation axis is rotated, the sweeping light beam can cover most or the entire area of the positioning sub-space.

Among others, an effective range of the positioning light beam emitted, in a sweeping manner, by the positioning light beam emission device can reach in each sweeping cycle can be set to cover the positioning sub-space where it is located, so that even if an object to be positioned moves arbitrarily in each positioning sub-space, a receiving device on the object to be positioned can receive the positioning light beam. As a preference, the effective range of the positioning light beam emitted, in a sweeping manner, by the positioning light beam emission device can be set to cover the positioning sub-space in which it is located, without exceeding the positioning sub-spaces adjacent to the positioning sub-space in which it is located. Among others, the effective range refers to a distance range for positioning that can be received and recognized by the receiving device. In this way, it is possible to avoid the occurrence of more laser overlapping areas.

A controller 3 is respectively connected with the plurality of positioning light beam emission devices, and is used for controlling sweeping modes of the plurality of positioning light beam emission devices such that the positioning light beam emitted, in a sweeping manner, by the positioning light beam emission devices in adjacent positioning sub-spaces at the same time are different, and/or the sweeping time periods of the positioning light beams emitted, in a sweeping manner, by the positioning light beam emission devices in adjacent positioning sub-spaces are different.

By controlling the sweeping modes of the plurality of positioning light beam emission devices, the occurrence of laser overlapping areas can be avoided. Here, there may be a variety of ways to avoid the occurrence of laser overlapping areas. For example, the positioning light beams emitted, in a sweeping manner, by the positioning light beam emission devices that may cause the laser overlapping areas may be encoded, or the positioning light beams emitted, in a sweeping manner, by the positioning light beam emission devices may be controlled (for example, the frequency or amplitude of the positioning light beam emitted, in a sweeping manner, by the positioning light beam emission device may be controlled), so that the positioning light beams emitted, in a sweeping manner, by the positioning light beam emission devices that may cause the laser overlapping areas are different, and a corresponding positioning light beam emission device can be determined according to the positioning light beam. Here, the technique is matured, which can be employed to encode the positioning light beam emitted, in a sweeping manner, by the positioning light beam emission device or controlling the frequency or amplitude of the positioning light beam emitted, in a sweeping manner, by the positioning light beam emission device, and will not be described in detail herein.

In addition, it is also possible to avoid the occurrence of laser overlapping areas by controlling the time of the positioning light beams emitted, in a sweeping manner, by the positioning light beam emission devices that may cause the laser overlap areas. For example, it is possible to control the positioning light beam emitting devices that may cause the laser overlap area so that the sweeping time periods of emitting, in a sweeping manner, the positioning light beam by them are different, thereby avoiding the occurrence of laser overlapping areas.

Among others, the positioning light beam emission device in each positioning sub-space can emit, in a sweeping manner, the positioning light beam toward the positioning sub-space in which it is located in two sweeping modes, and the working periods of the two sweeping modes are different. The sweeping rotation axis of the second positioning light beam in the second sweeping mode has a predetermined included angle with respect to the sweeping rotation axis of the first positioning light beam in the first sweeping mode. Here, as a preference, in each sweeping cycle, the positioning light beam emission device can horizontally sweep (sweep in a horizontal direction) and longitudinally sweep (sweep in a vertical direction) in a time-division manner toward the positioning sub-space in which it is located, wherein the extending direction of the linear cross section of the positioning light beam and the sweeping rotation axis under the horizontal sweeping are perpendicular to a horizontal plane, and the extending direction of the linear cross section of the positioning light beam and the sweeping rotation axis under the longitudinal sweeping are parallel to the horizontal plane.

In the case where the positioning light beam emission device includes the above two sweeping modes, the occurrence of laser overlapping areas can be avoided by controlling the order of the two sweeping modes of the positioning light beam emission device that may cause the laser overlapping areas, or the sweeping time periods of emitting, in a sweeping manner, the positioning light beam.

Figure 5:
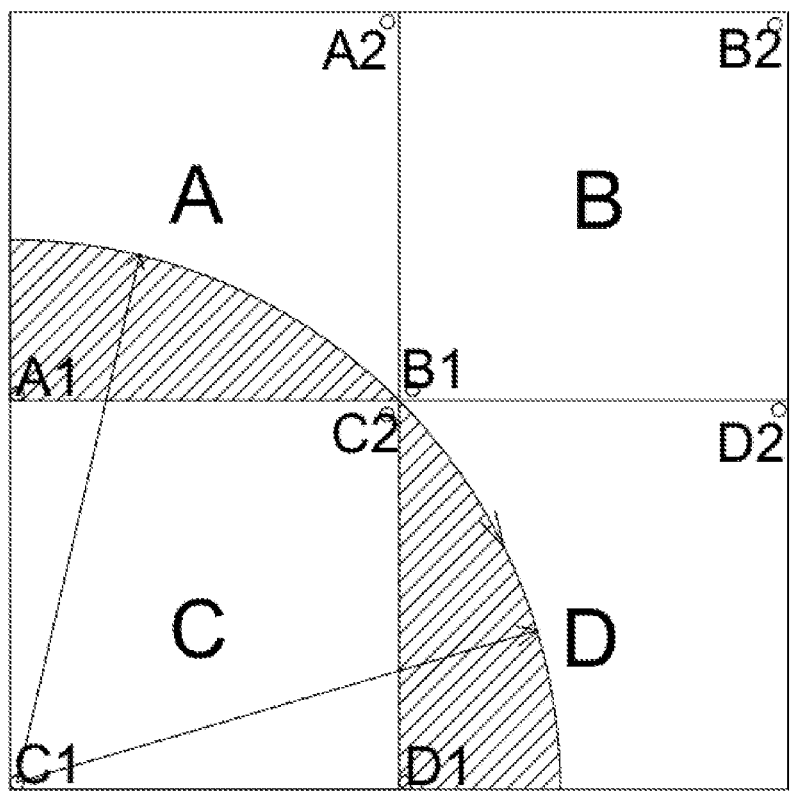
FIG. 5 is a diagram showing a state of the positioning light beam emission device located in a plurality of positioning sub-spaces according to an embodiment of the invention.

As shown in FIG. 5, the positioning light beam emission devices may be disposed at two positions away from each other in each positioning sub-space, respectively. Among others, FIG. 5 shows a case where the positioning sub-space is substantially a square area. However, it should be known that the positioning sub-space may also have other shapes, and the shapes of different positioning sub-spaces may be different. In the case where the positioning sub-space has other shapes, one positioning light beam emission device may be disposed on two ends at the farthest distance of the positioning sub-space, respectively. This way of avoiding the laser overlap areas will be further described below in conjunction with the embodiment shown in FIG. 3.

As shown in FIG. 5, the positioning sub-space described in the present invention may substantially be a square area. In order to avoid a situation where the light beam receiving device on the object to be positioned does not receive the positioning light beam due to occlusion, one positioning light beam emission device (A1, A2, B1, B2, C1, C2, D1, D2 in the figure) may be disposed near two vertices of the diagonal line in each positioning sub-space (A, B, C, D in the figure), respectively. As far as FIG. 5 is concerned, the positioning light beam emission device in each positioning sub-space can emit, in a sweeping manner, the positioning light beam toward the positioning sub-space in which it is located, at the corner where it is located, with a sweeping range of 90°. As described above, each of the positioning light beam emission devices can have two sweeping modes within each sweeping cycle, and herein it will be explained by an example that the two sweeping modes are horizontal sweeping (the extending direction of the linear cross section of the sweeping positioning light beam and the sweeping rotation axis are perpendicular to the horizontal plane) and longitudinal sweep (the extending direction of the linear cross section of the sweeping positioning light beam and the sweeping rotation axis are parallel to the horizontal plane), respectively.

With reference to FIG. 5, an effective range of the positioning light beam emitted, in a sweeping manner, by the positioning light beam emission device is set to cover the positioning sub-space in which it is located, without exceeding the positioning sub-spaces adjacent to the positioning sub-space in which it is located. To this end, one positioning light beam emission device may be disposed at two corners of the diagonal line in the positioning space, respectively, and the maximum distance that the positioning light beam emitted, in a sweeping manner, by each positioning light beam emission device can reach is greater than or equal to the length of the diagonal line, and less than or equal to 2 times of the side length of the square area, so that the positioning light beam emitted by the positioning light beam emission device in each positioning sub-space within each sweeping cycle can cover the positioning sub-space in which it is located, and cover other positioning sub-spaces as little as possible.

At this point, for the positioning sub-space C in FIG. 5, the positioning light beam that the positioning light beam emission device C1 sweeps toward the positioning sub-space C reaches a partial region (shaded portion in the figure) of the positioning sub-space A and the positioning sub-space D. Therefore, when the positioning light beam emission device C1 sweeps the positioning light beam in the direction toward the shaded portion, if the positioning light beam emission device in the positioning sub-space where the shaded portion is located, also sweeps the positioning light beam in the same direction toward this region, a laser overlapping area will occur, which may interfere with the later positioning.

In addition, for the positioning light beam emission device C1 and the positioning light beam emission device C2 in the positioning sub-space C, since both the positioning light beam emission device C1 and the positioning light beam emission device C2 sweep toward the positioning sub-space C1, the positioning light beams emitted, in a sweeping manner, by the positioning light beam emission device C1 and the positioning light beam emission device C2 may also generate a laser overlapping area in the positioning sub-space C.

Therefore, some adjustments need to be made to the sweeping process of the positioning light beam emission devices in adjacent positioning sub-spaces and the positioning light beam emission devices in the same positioning sub-space to avoid the occurrence of laser overlapping areas.

Specifically, in the case where the positioning light beam emission device has one sweeping mode, the time period when the positioning light beam is emitted, in a sweeping manner, by the positioning light beam emission device can be controlled, so that at the same time only one positioning light beam emission device is in a sweeping state for the positioning light beam emission devices which may generate an overlapping area.

In addition, as described above, the positioning light beam emission device can have two sweeping modes, and at this time, it is also possible to avoid the occurrence of laser overlapping areas by controlling the starting sequence and/or the sweeping time of the two sweeping modes of the positioning light beam emission device. For example, the occurrence of laser overlapping areas may be avoided by controlling so that the two sweeping modes of the positioning light beam emission device that are located in adjacent positioning sub-spaces sweep simultaneously are different in starting sequence, and the time periods when positioning light beam emission devices in the same positioning sub-space emit, in a sweeping manner, the positioning light beams are different. The occurrence of laser overlapping areas may also be avoided by controlling the time periods when the positioning light beam emission devices in adjacent positioning sub-spaces emit, in a sweeping manner, the positioning light beams are different, and the two sweeping modes of positioning light beam emission devices in the same positioning sub-space are different in starting sequence.

For example, for the adjacent positioning sub-space A and the positioning sub-space C, the starting sequences of the two sweeping modes of the positioning light beam emission device A1 and the positioning light beam emission device C1 can be controlled, so that the starting sequences of the two sweeping modes of the positioning light beam emission device A1 and the positioning light beam emission device C1 within each sweeping cycle are reversed. That is, when the positioning light beam emission device A1 performs horizontal sweeping and then longitudinal sweeping, the positioning light beam emission device C1 performs longitudinal sweeping and then horizontal sweeping. Thus, corresponding beam emitting devices can be distinguished according to the order of the two positioning light beams received by the light beam receiver. For the positioning light beam emission device C1 and the positioning light beam emission device C2 in the positioning sub-space C, it is possible to control the time period when the positioning light beam emission device C1 and the positioning light beam emission device C2 emit, in a sweeping manner, the positioning light beams, so that for the positioning sub-space C, at most one positioning light beam emission device is in operation at the same time.

In addition, it is also possible to adjust the time periods when the positioning light beam emission device A1 and the positioning light beam emission device C1 emit, in a sweeping manner, the positioning light beams within each sweeping cycle, so that the time periods when the positioning light beam emission device A1 and the positioning light beam emission device C1 emit, in a sweeping manner, the positioning light beams are different, and thus the generation of laser overlap areas can also be avoided. However, for the positioning light beam emission device C1 and the positioning light beam emission device C2 in the single positioning sub-space C, the starting sequences of the two sweeping modes of the positioning light beam emission device C1 and the positioning light beam emission device C2 can be controlled, so that the starting sequences of the two sweeping modes of the positioning light beam emission device C1 and the positioning light beam emission device C2 are reversed.

Figure 6:
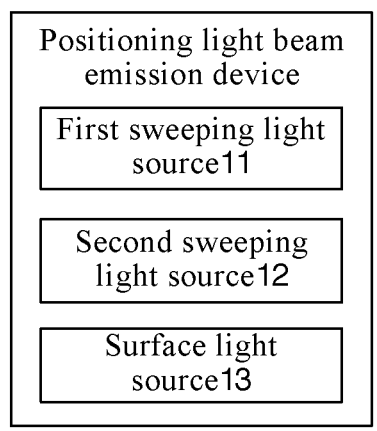
FIG. 6 is a schematic block diagram showing a structure of a positioning light beam emission device according to an embodiment of the present invention.

As described above, the positioning light beam emission device in each positioning sub-space can emit, in a sweeping manner, the positioning light beam in a time-division manner toward the positioning sub-space in which it is located in two sweeping modes. At this time, as shown in FIG. 6, each of the positioning light beam emission devices may include a first sweeping light source 11, a second sweeping light source 12, and a surface light source 13.

Within each sweeping cycle, the first sweeping source 11 can horizontally sweep a first positioning light beam toward a positioning sub-space at a predetermined angular velocity, and the second sweeping source 12 can longitudinally sweep a second positioning light beam toward a positioning sub-space at a predetermined angular velocity.

The surface light source 13 emits a planar light pulse toward the positioning sub-space in which it is located within each sweeping cycle.

Within each of the sweeping cycles, there is a first fixed time interval between a time when the first sweeping light source 11 starts to emit, in a sweeping manner, the first positioning light beam and a time when the surface light source 13 emits the planar light pulse, and there is a second fixed time interval between a time when the second sweeping light source 12 starts to emit, in a sweeping manner, the second positioning light beam and a time when the surface light source 13 emits said planar light pulse.

Figure 7:
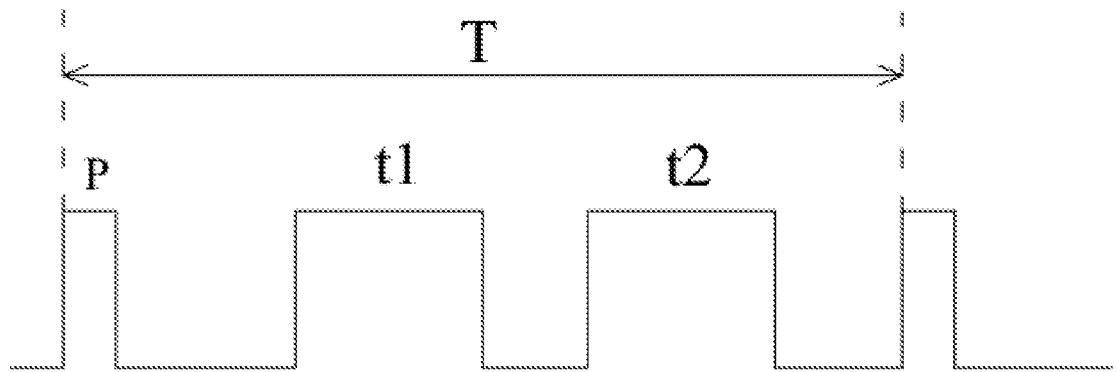
FIG. 7 is a diagram showing signal generation of the two sweeping light sources and the surface light source in a positioning light beam emission device according to an embodiment of the invention.

Among others, as shown in FIG. 7, the surface light source 13 can emit a planar light pulse P to the positioning sub-space in which it is located at a predetermined cycle T, and the first sweeping light source 11 and the second sweeping light source 12 can emit, in a sweeping manner, the positioning light beams at different time periods ($t_1$, $t_2$) within each cycle T.

As a preference, the planar light pulses emitted by surface light sources in two positioning light beam emission devices located in the same positioning sub-space are different, and a positioning light beam emission device corresponding to the surface light source emitting a planar light pulse can be determined according to the received planar light pulse.

Figure 8:
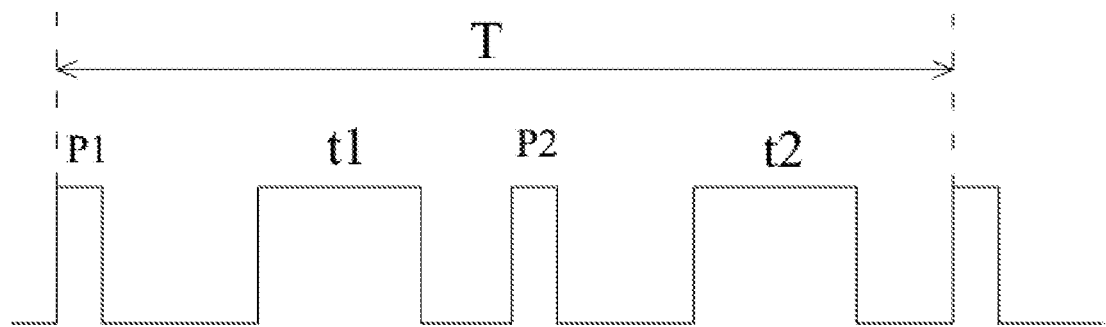
FIG. 8 is a diagram showing signal generation of the two sweeping light sources and the surface light source in a positioning light beam emission device according to another embodiment of the invention.

The situation shown in FIG. 7 is not very convenient to implement. Therefore, the present invention proposes another working mode in which the surface light source and the two sweeping light sources cooperate with each other. As shown in FIG. 8, within each sweeping cycle, the surface light source 13 emits two plane light pulses. After the surface light source 13 emits a first planar light pulse P1, the first sweeping light source 11 starts to sweep a positioning light beam to the positioning sub-space where it is located (period t1 in the figure). After the surface light source 13 emits a second planar light pulse P2, the second sweeping light source 12 starts to sweep a positioning light beam to the positioning sub-space in which it is located (period t2 in the figure). There is a fixed time interval between the first planar light pulse and the second planar light pulse.

So far, the positioning light beam emission system and method of the present invention have been described in detail with reference to FIGS. 1-8. Based on the above described positioning light beam emission system and method, the present invention also proposes an indoor positioning system.

Figure 9:
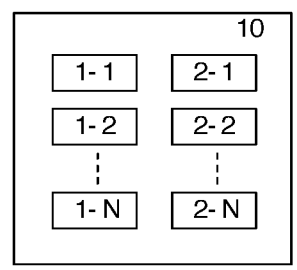
FIG. 9 is a schematic block diagram showing a structure of the indoor positioning system according to an embodiment of the present invention.

As shown in FIG. 9, the indoor positioning system 10 of the present invention includes a plurality of positioning light beam emission devices (1-1, 1-2, ..., 1-N in the figure, N is an integer) and a plurality of light beam receivers (2-1, 2-2, ..., 2-N in the figure, N is an integer). Among others, for the arrangement of the plurality of positioning light beam emission devices and the sweeping modes thereof, the relevant description given above may be referred to, and the details are not described herein again.

The plurality of light beam receivers are adapted for being fixed to an outer surface of an object to be positioned. When positioning the object to be positioned, the plurality of light beam receivers may be fixed to the outer surface of the object to be positioned, and at this time, the relative spatial position relationship among the plurality of light beam receivers is fixed. Each light beam receiver can receive positioning light beam emitted by the positioning light beam emission devices.

Figure 10:
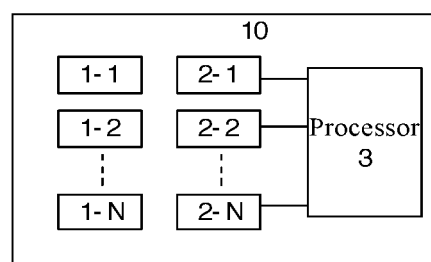
FIG. 10 is a schematic block diagram showing a structure of the indoor positioning system according to another embodiment of the present invention.

As shown in FIG. 10, the indoor positioning system 10 of the present invention may further include a processor 3. The processor 3 is respectively connected with the plurality of light beam receivers (in either wireless or wired manner). The processor 3 can be adapted for being fixed to the object to be positioned or to be fixed at other locations. The processor 3 can receive the positioning light beams received by the light beam receivers. When the object to be positioned moves in the plurality of positioning sub-spaces, the processor 3 can identify a corresponding positioning light beam emission device based on the positioning light beams received by the light beam receivers on the object to be positioned. As a result, the position of the object to be positioned can be determined according to the time, angular velocity, and relative spatial position relationship that the light beam receivers receive the positioning light beams within one sweeping cycle, respectively, and the identified predetermined position of the positioned beam emitting device. Among others, the time at which the light beam receivers receives the positioning light beams may be recorded by the light beam receivers or may be recorded by the processor 3 (that is, when the processor 3 receives the positioning light beams received by the light beam receivers in real time, the time at which the positioning light beams are acquired from the light beam receivers may be recorded by the processor 3 as the times at which the light beam receivers receive the positioning light beams). A specific positioning process of the indoor positioning system 10 of the present invention is described below.

The sweeping cycle and angular velocity of the positioning light beam emission device in each positioning sub-space are known. Within one sweeping cycle of the positioning light beam emission device, the time at which the positioning light beam emission device starts to emit, in a sweeping manner, the positioning light beam can be recorded as $t_0$, and the time at which the light beam receiver receives the positioning light beam can be recorded as $t_1$. Since the angular velocity of the positioning light beam emission device is constant (known), based on the time difference between $t_1$ and $t_0$, it is possible to determine the angle at which the positioning light beam emission device rotates to the positioning light beam receiver, and thereby the direction of the light beam receiver relative to the positioning light beam emission device can be determined. By analogy, within one sweeping cycle, the directions of the plurality of positioning light beam receivers that receive the positioning light beams, relative to the positioning light beam emission device, can be determined, and then the positional information in the horizontal direction of the plurality of positioning light beam receivers can be determined according to the relative spatial position relationship among the plurality of positioning light beam receivers. As a result, the horizontal position at which the object to be positioned is located can be determined.

Further, as described above, the positioning light beam emission device in each positioning sub-space can emit, in a sweeping manner, the positioning light beam toward the positioning sub-space in which it is located in two sweeping modes, and the working periods of the two sweeping modes are different. The sweeping rotation axis of the second positioning light beam in the second sweeping mode has a predetermined included angle with respect to the sweeping rotation axis of the first positioning light beam in the first sweeping mode. Here, as a preference, in each sweeping cycle, the positioning light beam emission device can horizontally sweep and longitudinally sweep in a time-division manner toward the positioning sub-space in which it is located, wherein the extending direction of the linear cross section of the positioning light beam and the sweeping rotation axis under the horizontal sweeping are perpendicular to a horizontal plane, and the extending direction of the linear cross section of the positioning light beam and the sweeping rotation axis under the longitudinal sweeping are parallel to the horizontal plane.

At this time, the processor 3 may determine the direction of the light beam receiver relative to the positioning light beam emission device, according to the time when the light beam receiver receives the first positioning light beam and the time when it receives the second positioning light beam within each sweeping cycle. Thus, the position of the object to be positioned can be determined according to the directions of the plurality of light beam receivers that receive both the first positioning light beam and the second positioning light beam within one sweep cycle relative to the positioning light beam emission device, and the relative spatial position relationship among the plurality of light beam receivers.

A process of positioning the object to be positioned will be explained in detail below by an example in which the positioning light beam emission device horizontally sweeps the positioning light beam and longitudinally sweeps the positioning light beam toward the positioning sub-space, respectively.

The time periods when the positioning light beam emission device performs horizontal sweeping and longitudinal sweeping within each sweeping cycle are different, and the angular velocity of the horizontal sweeping and longitudinal sweeping is known. Taking an example that the positioning light beam emission device performs horizontal sweeping and then longitudinal sweeping, within one sweeping cycle of the positioning light beam emission device, the time at which the positioning light beam emission device starts to horizontally emit, in a sweeping manner, the positioning light beam can be recorded as $t_0$, and the time at which the light beam receiver receives the horizontally swept positioning light beam can be recorded as $t_1$. Since the angular velocity of the positioning light beam emission device in horizontal sweeping is constant (known), the processor 3 may determine a plane where the positioning light beam for horizontal sweeping is located at $t_1$, according to the time difference between $t_1$ and $t_0$, and the angular velocity of horizontal sweeping. Correspondingly, the time at which the positioning light beam emission device starts to longitudinally emit, in a sweeping manner, the positioning light beam can be recorded as $t_2$, and the time at which the light beam receiver receives the longitudinally swept positioning light beam can be recorded as $t_3$. Since the angular velocity of the positioning light beam emission device in longitudinal sweeping is constant (known), the processor 3 may determine a plane where the positioning light beam for longitudinal sweeping is located at $t_3$, according to the time difference between $t_3$ and $t_2$, and the angular velocity of longitudinal sweeping. Since both the positioning light beam emission device and the light beam receiver are in the two planes, the intersection direction of the two planes is the direction of the light beam receiver relative to the positioning light beam emission device. Thereby, the intersection directions where the plurality of light beam receivers are located, can be determined, and then the three-dimensional position information of the object to be positioned can be obtained according to the relative spatial position relationship among the plurality of light beam receivers.

The positioning light beam emission system, method and indoor positioning system according to the present invention have been described in detail above with reference to the accompanying drawings. Based on the above description, the positioning light beam emission system, method and indoor positioning system of the present invention provides the possibility of infinitely expanding the positioning space while maintaining the advantages such as high positioning accuracy (within millimetres), small delay, independent calculation of coordinate position of a point to be positioned, and no effect from natural light, compared with the existing laser positioning technology.

The embodiments of the present invention have been described above, and the foregoing description is illustrative, not limiting, and not limited to the disclosed embodiments. Numerous modifications and changes will be apparent to those skilled in the art without departing from the scope and spirit of the embodiments of the invention described. The selection of terms used herein is intended to best explain the principles, practical applications, or improvements of techniques in the market in the various embodiments, or to enable other ordinary persons skilled in the art to understand the embodiments disclosed herein.

The invention claimed is:

1. A positioning system based on light emissions, configured to emit light beams to a target area to locate an object, said target area is divided into a plurality of positioning sub-spaces, said system comprising:
   a plurality of positioning light beam emission devices, disposed at predetermined positions in said plurality of positioning sub-spaces, respectively, each of said positioning light beam emission devices being used for emitting, in a sweeping manner, a positioning light beam toward the positioning sub-space, in which each device is located, with a predetermined sweeping cycle and at a predetermined angular velocity, said positioning light beam having a linear cross section emitted in a sweeping motion about a rotation axis, the rotation axis not being perpendicular to an extended direction of said linear cross section; and
   a controller, which is respectively connected to each positioning light beam emission device, and is configured to adjust the positioning light beams generated by different positioning light beam emission devices to be different, by encoding said positioning light beams emitted in a sweeping manner, by said plurality of positioning light beam emission devices.

2. The positioning light beam emission system according to claim 1, wherein
   under the control of said controller,
   the positioning light beams emitted by the positioning light beam emission devices that emit the positioning light beams at the same time are different, or
   the positioning light beams emitted by the positioning light beam emission devices in adjacent positioning sub-spaces are different.

3. The positioning light beam emission system according to claim 1, wherein each of said positioning light beam emission devices emits the positioning light beam toward the positioning sub-space, in which it is located, in two sweeping modes within each of said sweeping cycles,
   said two sweeping modes have different working periods, and/or frequencies, amplitudes or codes;
   the positioning light beams emitted in a sweeping motion around the rotation axis in the second sweeping mode has a predetermined included angle with respect to the sweeping rotation axis of the first positioning light beam, in the sweeping mode.

4. The positioning light beam emission system according to claim 3, wherein
   the extended direction from the linear cross section and the sweeping rotation axis of said first positioning light beam are perpendicular to a horizontal plane, and the extended direction of the linear cross section and the sweeping rotation axis of said second positioning light beam are parallel to the horizontal plane; or
   the extending direction of the linear cross section and the sweeping rotation axis of said first positioning light beam are parallel to the horizontal plane, and the extending direction of the linear cross section and the sweeping rotation axis of said second positioning light beam are perpendicular to the horizontal plane.

5. The positioning light beam emission system according to claim 4, wherein
   an effective range of the positioning light beam emitted, in sweeping manner, by the positioning light beam emission device is set to cover the positioning sub-space in which it is located, without extending into the positioning sub-spaces adjacent to the positioning sub-space in which it is located.

6. The positioning light beam emission system according to claim 5, wherein
   said positioning light beam emission devices are disposed at two positions away from each other in each of said positioning sub-spaces, respectively,
   the two sweeping modes of the positioning light beam emission devices that are located in adjacent positioning sub-spaces and emit, in a sweeping manner, simultaneously are different in starting sequence, and the time periods when different positioning light beam emission devices in the same positioning sub-space emit, in a sweeping manner, the positioning light beams are different; or
   the time periods when the positioning light beam emission devices in adjacent positioning sub-spaces emit, in a sweeping manner, the positioning light beams are different, and the two sweeping modes of different positioning light beam emission devices in the same positioning sub-space are different in starting sequence.

7. The positioning light beam emission system according to claim 5, wherein said positioning light beam emission device comprises:
   a first sweeping light source for sweeping said first positioning light beam toward the positioning sub-space in which it is located;
   a second sweeping light source for emitting, in a sweeping motion, said second positioning light beam toward the positioning sub-space in which it is located; and
   a surface light source for emitting a planar light pulse toward the positioning sub-space in which it is located within each of said sweeping cycles,
   said first sweeping light source and said second sweeping light source emit, in a sweeping manner, the positioning light beams toward the positioning sub-spaces in which they are located within different time periods of the sweeping cycle, within each of said sweeping cycles,
there is a first fixed time interval between a time when said first sweeping light source starts to emit, in a sweeping manner, said first positioning light beam and a time when said surface light source emits said planar light pulse, and
there is a second fixed time interval between a time when said second sweeping light source starts to emit, in a sweeping manner, said second positioning light beam and a time when said surface light source emits said planar light pulse.

8. The positioning light beam emission system according to claim 7, wherein
within each of said sweeping cycles,
after said surface light source emits a first planar light pulse, said first sweeping light source starts to emit, in a sweeping manner, the positioning light beam toward the positioning sub-space in which it is located, and
after said surface light source emits a second planar light pulse, said second sweeping light source starts to emit, in a sweeping manner, the positioning light beam toward the positioning sub-space in which it is located, and there is a fixed time interval between said first planar light pulse and said second planar light pulse,
there is the first fixed time interval between a time when said first sweeping light source starts to emit, in a sweeping manner, said first positioning light beam and a time when said surface light source emits said first planar light pulse, and
there is the second fixed time interval between a time when said second sweeping light source starts to emit, in a sweeping manner, said second positioning light beam and a time when said surface light source emits said second planar light pulse.

9. The indoor positioning system according to claim 1, wherein
planar light pulses emitted by surface light sources in two positioning light beam emission devices located in the same positioning sub-space are different, and said processor determines a positioning light beam emission device corresponding to each of the surface light sources emitting a planar light pulse according to the planar light pulse received by said light beam receiver.

10. The indoor positioning system according to claim 1, wherein
within each of said sweeping cycles,
after said surface light source emits a first planar light pulse, said first sweeping light source starts to emit, in a sweeping manner, the positioning light beam toward the positioning sub-space in which it is located, and
after said surface light source emits a second planar light pulse, said second sweeping light source starts to emit, in a sweeping manner, the positioning light beam toward the positioning sub-space in which it is located, and there is a fixed time interval between said first planar light pulse and said second planar light pulse,
there is the first fixed time interval between a time when said first sweeping light source starts to emit, in a sweeping manner, said first positioning light beam and a time when said surface light source emits said first planar light pulse, and
there is the second fixed time interval between a time when said second sweeping light source starts to emit, said second positioning light beam and a time when said surface light source emits said second planar light pulse.

11. A positioning light beam emission method for emitting a positioning light beam toward a positioning space, said positioning space comprising a plurality of positioning sub-spaces, each of said positioning sub-spaces being provided with a positioning light beam emission device, said method comprising:
the positioning light beam emission device in each of said positioning sub-spaces sweeping the positioning light beam toward the positioning sub-space in which it is located with a predetermined sweeping cycle and at a predetermined angular velocity, said positioning light beam having a linear cross section and rotating about a sweeping rotation axis, and said sweeping rotation axis being not perpendicular to the extending direction of said linear cross section;
the frequency, amplitude or code of the positioning light beams emitted, in a sweeping manner, by different positioning light beam emission devices being different.

12. The positioning light beam emission method according to claim 11, wherein
the positioning light beams emitted in a sweeping manner by the positioning light beam emission devices that emit the positioning light beams at the same time are different, or
the positioning light beams emitted in a sweeping manner by the positioning light beam emission devices in adjacent positioning sub-spaces are different.

13. An indoor positioning system for positioning an object to be positioned in a positioning space, said positioning space comprising a plurality of positioning sub-spaces, said system comprising:
a plurality of positioning light beam emission devices, disposed at predetermined positions in said plurality of positioning sub-spaces, respectively,
each of the positioning light beam emission devices for emitting the positioning light beam toward the positioning sub-space in which it is located with a predetermined sweeping cycle and at a predetermined angular velocity,
wherein said positioning light beam has a linear cross section and rotates about a sweeping rotation axis, said sweeping rotation axis is not perpendicular to the extended direction of said linear cross section, and the frequency, amplitude or code of the positioning light beams emitted, in a sweeping manner, by different the positioning light beam emission devices being different;
a plurality of light beam receivers, adapted for being fixed at an outer surface of said object to be positioned, for receiving said positioning light beams, the relative spatial position relationship among said plurality of light beam receivers being fixed.

14. The indoor positioning system according to claim 13, wherein
the positioning light beams emitted, in one sweeping cycle, in a sweeping manner, by the positioning light beam emission devices that emit the positioning light beams at the same time are different, or
the positioning light beams emitted, in one sweeping cycle, in a sweeping manner, by the positioning light beam emission devices in adjacent positioning sub-spaces are different.

15. The indoor positioning system according to claim 13, further comprising:
a processor, configured to determine a positioning light beam emission device corresponding to the positioning light beam, according to a positioning light beam received by said plurality of light beam receivers and/or the time of receiving the positioning light beam, and determine the position of said object to be positioned according to the time when said plurality of light beam receivers respectively receive said positioning light beam within one sweeping cycle, said angular velocity, said relative spatial position relationship, and the determined predetermined position of the positioning light beam emission device.

16. The indoor positioning system according to claim 15, wherein
each of said positioning light beam emission devices emits, the positioning light beam toward the positioning sub-space in which it is located in two sweeping modes, in a sweeping cycle,
said two sweeping modes have different working periods, and/or the frequency, amplitude or code of said positioning light beams emitted, in a sweeping manner,
the sweeping rotation axis of the second positioning light beam in the second sweeping mode, has a predetermined included angle with respect to the sweeping rotation axis of the first positioning light beam in the first sweeping mode.

17. The indoor positioning system according to claim 16, wherein
said processor determines the direction of said light beam receiver relative to said positioning light beam emission device, according to the time when said light beam receiver receives said first positioning light beam and the time when it receives said second positioning light beam within each of the sweeping cycle, or/and,
said processor determines the position of said object to be positioned, according to the directions of said plurality of light beam receivers that receive both said first positioning light beam and said second positioning light beam within one sweeping cycle, relative to said positioning light beam emission device, and a predetermined relative spatial position relationship among said plurality of light beam receivers.

18. The indoor positioning system according to claim 16, wherein the extending direction of the linear cross section and the sweeping rotation axis of said first positioning light beam are perpendicular to a horizontal plane, and the extending direction of the linear cross section and the sweeping rotation axis of said second positioning light beam are parallel to the horizontal plane; or
the extending direction of the linear cross section and the sweeping rotation axis of said first positioning light beam are parallel to the horizontal plane, and the extending direction of the linear cross section and the sweeping rotation axis of said second positioning light beam are perpendicular to the horizontal plane.

19. The indoor positioning system according to claim 16, wherein an effective range of the positioning light beam emitted, in a sweeping manner, by the positioning light beam emission device is set to cover the positioning sub-space in which it is located, without extending into the positioning sub-spaces adjacent to the positioning sub-space in which it is located.

20. The indoor positioning system according to claim 19, wherein
said positioning light beam emission devices are disposed at two positions away from each other in each of said positioning sub-spaces, respectively,
the two sweeping modes of the positioning light beam emission device that are located in adjacent positioning sub-spaces and emits, in a sweeping manner, simultaneously are different in starting sequence, and the time periods when different positioning light beam emission devices in the same positioning sub-space emits, in a sweeping manner, the positioning light beams are different; or
the time periods when the positioning light beam emission devices in adjacent positioning sub-spaces emits, in a sweeping manner, the positioning light beams are different, and the two sweeping modes of different positioning light beam emission devices in the same positioning sub-space are different in starting sequence.

21. The indoor positioning system according to claim 20, wherein said positioning light beam emission device comprises:
a first sweeping light source for emitting said first positioning light beam toward the positioning sub-space in which it is located;
a second sweeping light source for emitting said second positioning light beam toward the positioning sub-space in which it is located; and
a surface light source for emitting a planar light pulse toward the positioning sub-space in which it is located within each of said sweeping cycles,
said first sweeping light source and said second sweeping light source emit, the positioning light beams toward the positioning sub-spaces in which they are located, within different time periods of the sweeping cycle,
within each of said sweeping cycles, there is a first fixed time interval between a time when said first sweeping light source starts to emit said first positioning light beam and a time when said surface light source emits said planar light pulse, and there is a second fixed time interval between a time when said second sweeping light source starts to emit, in a sweeping manner, said second positioning light beam and a time when said surface light source emits said planar light pulse.

* * * * *